(12) United States Patent
Talluri et al.

(10) Patent No.: US 9,913,095 B2
(45) Date of Patent: Mar. 6, 2018

(54) ENHANCED MOBILE BASE STATION

(71) Applicant: Parallel Wireless, Inc., Nashua, NH (US)

(72) Inventors: Murali Talluri, Shirley, MA (US); Kaitki Agarwal, Westford, MA (US); Rajesh Kumar Mishra, Westford, MA (US); Sumit Garg, Hudson, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/946,749

(22) Filed: Nov. 19, 2015

(65) Prior Publication Data

US 2016/0142880 A1    May 19, 2016

Related U.S. Application Data

(60) Provisional application No. 62/082,111, filed on Nov. 19, 2014.

(51) Int. Cl.
*H04W 4/02* (2009.01)
*H04W 52/28* (2009.01)
*H04W 4/06* (2009.01)
*H04W 68/00* (2009.01)

(52) U.S. Cl.
CPC ............ *H04W 4/025* (2013.01); *H04W 4/06* (2013.01); *H04W 52/282* (2013.01); *H04W 68/005* (2013.01)

(58) Field of Classification Search
CPC ... H04W 68/003; H04W 4/027; H04W 4/046; H04W 4/025; H04W 4/06; H04W 52/282

USPC ........................................................ 455/569.2
See application file for complete search history.

(56) References Cited

U.S. PATENT DOCUMENTS

| | | | |
|---|---|---|---|
| 6,999,725 | B2 | 2/2006 | Nitta et al. |
| 8,112,115 | B2 | 2/2012 | Natsuno et al. |
| 8,725,185 | B2 | 5/2014 | Ozaki et al. |
| 8,967,533 | B2 | 3/2015 | DeVaul et al. |
| 9,078,286 | B1 | 7/2015 | Yuan et al. |
| 2006/0083186 | A1 | 4/2006 | Handforth et al. |
| 2007/0030809 | A1 | 2/2007 | Dayama |
| 2008/0070565 | A1 | 3/2008 | Maeda |
| 2010/0234071 | A1 | 9/2010 | Shabtay et al. |
| 2011/0009056 | A1* | 1/2011 | Hanson ............ H04B 7/15535 455/9 |
| 2013/0084871 | A1 | 4/2013 | Kitaji et al. |
| 2013/0116908 | A1 | 5/2013 | Oh et al. |
| 2014/0059351 | A1* | 2/2014 | Braskich ............... G06F 21/36 713/171 |
| 2014/0192781 | A1* | 7/2014 | Teyeb .................. H04W 36/34 370/331 |
| 2014/0206368 | A1 | 7/2014 | Maltsev et al. |

(Continued)

*Primary Examiner* — Marisol Figueroa
(74) *Attorney, Agent, or Firm* — Michael Y. Saji (57) ABSTRACT

Systems and methods for an in-vehicle base station are described. In one embodiment, a mobile base station is disclosed comprising a first access radio for providing an access network inside and outside a vehicle; a second backhaul radio for providing a backhaul connection to a macro cell; and a global positioning system (GPS) module for determining a location of the mobile base station, and for transmitting the location of the mobile base station to a core network, wherein a transmit power of the first access radio is configured to increase or decrease based on a speed of the vehicle.

9 Claims, 7 Drawing Sheets

(56) References Cited

U.S. PATENT DOCUMENTS

| | | | |
|---|---|---|---|
| 2014/0233412 A1 | 8/2014 | Mishra et al. | |
| 2014/0247807 A1* | 9/2014 | Westerberg | H04W 36/34 370/331 |
| 2015/0304863 A1* | 10/2015 | Gupta | H04W 4/04 455/423 |
| 2015/0365954 A1 | 12/2015 | Levine et al. | |
| 2016/0088585 A1 | 3/2016 | Garg | |
| 2016/0165548 A1* | 6/2016 | Mohlmann | H04B 7/15535 455/522 |
| 2016/0242226 A1 | 8/2016 | Fushiki et al. | |

* cited by examiner

ENHANCED MOBILE BASE STATION

CROSS-REFERENCE TO RELATED APPLICATIONS

This application claims the benefit of priority under 35 U.S.C. § 119(e) of U.S. Provisional Patent Application No. 62/082,111, filed Nov. 19, 2015, and entitled "Enhanced Mobile Base Stations," which is hereby incorporated by reference in its entirety for all purposes. Additionally, U.S. patent application Ser. Nos. 14/454,670, 14/777,246, 14/183,176, 14/864,194, 14/923,392, and 14/946,129, are hereby incorporated by reference in their entirety for all purposes. The present application also hereby incorporates U.S. Pat. No. 8,867,418, "Methods of incorporating an Ad Hoc Cellular Network into a Fixed Cellular Network," filed Feb. 18, 2014, and U.S. Pat. No. 8,879,416, "Heterogeneous Self-Organizing Network," filed Jan. 3, 2014, by reference for all purposes.

BACKGROUND

Wireless multimedia services are typically delivered through a series of macro base stations placed on towers or other strategic locations. This architectural layout applies to civilian and public safety networks. However, it is difficult to provide efficient, effective service to mobile base stations using the same approaches used for current macro networks. On the public safety side, ensuring reliable coverage in hard-to-reach and remote areas has also been a major challenge.

As well, Wi-Fi access points are now commonly found mounted in vehicles. Additionally, widespread LTE technology enables high bandwidth data to be backhauled from an access network at an in-vehicle base station. However, in-vehicle base stations are still relatively uncommon. The present disclosure describes improvements to mobile base stations and in-vehicle base stations.

SUMMARY

Systems and methods are disclosed for mobile base stations configured to provide access for mobile devices and configured to be mounted to a vehicle. In one embodiment, a mobile base station is disclosed, comprising: a first access radio for providing an access network inside and outside a vehicle; a second backhaul radio for providing a backhaul connection to a macro cell; and a global positioning system (GPS) module for determining a location of the mobile base station, and for transmitting the location of the mobile base station to a core network, wherein a transmit power of the first access radio is configured to increase or decrease based on a speed of the vehicle.

The mobile base station may be an eNodeB. The mobile base station may be affixed to one of a car, a truck, a van, a trailer, a plane, a boat, a drone, or a balloon. The mobile base station may further comprise a third access radio for providing a second access network, the first and third access radios being configured to provide access networks using a Long Term Evolution (LTE) air interface and a Wi-Fi air interface, respectively. The speed of the vehicle may be determined based on either the GPS module or a vehicle controller access network (CAN) bus. The mobile base station may be configured to use the second backhaul radio to communicate with a coordinating node for determining a transmit power of the first access radio. The mobile base station may be configured to use the second backhaul radio to receive an appropriate power level, a directionality of broadcast power, a neighbor list, or a tracking area list from a coordinating node. The mobile base station may further comprise a tablet connected to the first access radio, the mobile base station being configured to permit the tablet to access and reconfigure the mobile base station.

In another embodiment, a method is disclosed, comprising: broadcasting, at an in-vehicle base station, an access network at a first power; detecting a transition from a stationary state to a moving state of the in-vehicle base station; reducing a transmit power of the in-vehicle base station while in the moving state; and increasing the transmit power of the in-vehicle base station when exiting the moving state.

The method may further comprise communicating with a coordinating node for determining the transmit power of the in-vehicle base station while in the moving state. The method may further comprise receiving, from a vehicle controller area network (CAN) bus, one of a vehicle ignition turn-on indication, an engine turn-off indication, a vehicle electrical power activation indication, a vehicle electrical power deactivation indication, an accelerometer indication, or a vehicle gear shift indication; and using the indication from the CAN bus to determine the transmit power. The method may further comprise receiving, from a coordinating node in a core network, an appropriate power level, a directionality of broadcast power, a neighbor list, or a tracking area list.

In another embodiment, a method is disclosed, comprising: attaching, at a mobile base station, to a macro cell for providing backhaul to devices using the mobile base station for access; receiving a first tracking area code from the macro cell; permitting a mobile device to attach to the mobile base station; transmitting a second tracking area code to the mobile device, the second tracking area code corresponding to a tracking area managed by a coordinating node; detecting, at a mobile base station, a transition from a stationary state to a moving state of the mobile base station; and sending a tracking area update message to a core network to transition to the tracking area managed by a coordinating node, thereby avoiding unnecessary tracking area updates for the mobile device.

The method may further comprise performing paging of the mobile device using the second tracking area code. The method may further comprise detecting the location of the base station using a global positioning system (GPS) module, and sending the location to the coordinating node. The method may further comprise detecting the location of the mobile device based on the location of the base station.

DETAILED DESCRIPTION

A mobile base station may be configured to provide access to mobile devices, such as user equipments (UEs), that use the 3GPP Long Term Evolution (LTE) protocol. Such a mobile base station may be an eNodeB (evolved nodeB). The location of the mobile base station may be determined using, for example, the Global Positioning System (GPS) or any other location-determining means (e.g., GLONASS, A-GPS, Wi-Fi based location tracking, accelerometer and dead reckoning system, etc.). The mobile base station may be equipped with a built-in GPS or other location-determining means. Based on knowledge of the location of the mobile base station, various enhancements may be enabled.

The mobile base station may provide access to UEs. The mobile base station creates a mobile radio access network (mobile RAN), which may be in a stationary position for a time, or which may be in motion while the RAN is in operation, in some embodiments. For example, a mobile RAN may be created in a stationary vehicle or in a mobile vehicle. Where used herein, vehicle may refer to a car, truck, van, trailer, plane, boat, drone, balloon, unmanned or manned vehicle, or any other appropriate conveyance.

Creating a Mobile RAN in Motion

In some situations, areas may exist with little or no coverage, or specific spots may exist within a larger network with reduced or no coverage. For example, in-building coverage may be limited or not present. A mobile base station mounted in a vehicle, such as a car, truck, van, drone or balloon, may be enabled to create a mobile RAN for coverage on demand upon arrival in such areas or spots. UEs that previously were not receiving good coverage may obtain service from the mobile RAN. The mobile base station may use a wireless backhaul connection to provide service to devices attached to the mobile RAN.

In some embodiments, the mobile base station may be configured to create no mobile RAN while in motion, or may be configured to create a mobile RAN only while not in motion. For example, the mobile base station may create a mobile RAN with an effective radius of 10 feet. The mobile RAN may use one or more measures of signal strength and signal quality, such as RSSI, RSRQ, BLER, or another measure, received from a measurement report from an attached UE or a nearby UE, to determine whether the mobile RAN is created with the appropriate size. In some embodiments, the mobile base station may create both a mobile RAN using one protocol and a mobile hotspot using another protocol, e.g., LTE and Wi-Fi, of the appropriate size while moving.

In some embodiments, the mobile base station may determine, based on GPS location, or based on other connectivity with the vehicle, such as with a vehicle CAN bus or power bus, that the mobile base station is in motion. One or more thresholds may be used to determine whether to activate the mobile RAN and whether the mobile base station is in motion at a particular time. In some embodiments, GPS location may be monitored to generate location data, and the location data may be used to determine a change in location, a velocity, an acceleration, and/or a duration of motion. In some embodiments, sensor fusion may be used, either with multiple location measurements from the mobile base station, or with location measurements from the vehicle and/or attached UEs, to determine the location of a mobile base station with greater accuracy. In other embodiments, a vehicle may communicate its velocity, acceleration, and/or the duration in motion to the mobile base station. The mobile base station may then either evaluate one or more thresholds itself or may transmit the location-based data to a cloud coordination server.

In some embodiments, a threshold of 40 miles per hour (MPH) and 15 seconds of motion may be used. In some embodiments, a threshold of 50 feet or 100 feet of location displacement may be used. In some embodiments, a mobile base station may periodically report its location, velocity, and/or duration of motion. In some embodiments, a hysteresis parameter may be used to reduce the likelihood that motion will be detected when the vehicle is not in motion or if the mobile base station has not moved to a significant extent. The hysteresis parameter may be a speed-based parameter.

Various parameters may be adjusted based on the motion state of the vehicle, including: transmit power for Wi-Fi mesh, LTE backhaul, Wi-Fi access, LTE access; and also selection of a different physical cell ID (PCI) and/or automatic neighbor relations (ANR) table, differently-configured whitelists or blacklists for enabling devices to connect or attach, and so on. PCI may be selected in such a way that the PCI of the in-vehicle base station does not coincide with the PCI of any neighbor; this may be based on pre-configuration, or communication with a coordinating node, or deduction based on detected PCIs in the area after the vehicle has moved.

In operation, a vehicle equipped with such a mobile base station may be started up in a parking lot. At vehicle startup, the mobile base station may connect to a core network or to a cloud coordination server, for example, attaching to an existing macro node, and may receive configuration commands and may start broadcasting a RAN with connectivity to the core network. Once the vehicle begins moving, the mobile base station may communicate to the core network or to a cloud coordination server that the vehicle has begun moving, based on a configured threshold. Motion may trigger a different mode of operation than stationary operation. The mobile base station may stop broadcasting the RAN. The mobile base station may also reduce the radius of the existing RAN or may start broadcasting a new RAN.

The mobile base station may periodically inform the core network or cloud coordination server of its position and velocity, and may receive instructions regarding whether or not to provide a RAN and to what area it should provide a RAN. The mobile base station may report its location periodically based on time, or periodically based on distance traveled, or a combination of both, similar to a taxi meter.

Once the vehicle stops moving, for example, by the vehicle being parked, the mobile base station, by itself or in communication with the core network or cloud coordination server, may once again begin to broadcast the old RAN or a new RAN. The new RAN may use a different tracking area ID. All operational parameters may be monitored at the core network or cloud coordination server, including GPS coordinates, using a mobile backhaul connection active between the mobile base station and, for example, a macro cell connected to the core network, allowing the core network or cloud coordination server to perform control operations. In some embodiments, the core network may appropriately configure the base station with a backhaul macro, tracking area, etc. based on the current location of the mobile base station.

In some embodiments, operation in either the stationary mode and/or the in-motion mode, and/or switching between operational modes, may be triggered or based on one or more of the following inputs to the mobile base station: receiving, from a vehicle controller or vehicle controller area network (CAN) bus connected to the mobile base station, an ignition or engine turn-on indication; an engine turn-off indication; activation or deactivation of vehicle power; a value from a vehicle GPS or vehicle accelerometer; and/or a gearshift into or out of Park. For example, when the ignition of a vehicle is turned on, a vehicle CAN bus may relay this information to other nodes on the CAN bus, which may include the mobile base station, and the mobile base station may enter into an stationary operational mode. When the vehicle is then shifted out of Park, the mobile base station may receive this information and may enter into an in-motion operational mode. When the vehicle is shifted into Park, the mobile base station may receive this information and may enter into the stationary operational mode.

One example of a heuristic for activating radios in motion or when stationary is shown below, with relation to a base station with five radio transceivers: 1. LTE access; 2. Wi-Fi access; 3. Wi-Fi mesh; 4. LTE backhaul; 5. GPS receiver. In addition, wired Ethernet ports may be provided for use by devices inside the vehicle.

the mobile base station, the mobile base station may be assigned an appropriate macro cell for mobile wireless backhaul or other purposes.

The mobile base station may also be assigned a tracking area and/or one or more cells for associating with any UEs that will be attached to the mobile base station. The tracking area may be a tracking area code (TAC) or tracking area identity (TAI). A mapping of tracking areas and mobile base stations may be located at the cloud coordination server, in some embodiments, and a request from the core network for a UE in a particular tracking area may be directed to the cloud coordination server for identification of the specific mobile base station to which the UE is attached. In some embodiments, a mobile device may query the core network and/or cloud coordination server for, and/or may receive, one or more new tracking areas each time it is stopped in a new location.

Since the tracking area of the mobile base station is managed at the cloud coordination server, the mobile base station may be reconfigured with different tracking areas, and the cloud coordination server may perform brokering of requests for UEs within different tracking areas to ensure that all UEs receive calls. The location of the mobile base station may be used to assign tracking areas. The location of the mobile base station may also thus be used to determine

TABLE 1

| Mode | Wi-Fi Mesh | LTE Backhaul | Wi-Fi Access | Wired Access | LTE Access | UE's use |
|---|---|---|---|---|---|---|
| Vehicle in motion | Disabled | On for communications to coordinating node, core network | On for devices inside vehicle only | On | Disabled to prevent interfering with nearby cells. UEs connect via Wi-Fi. | UE uses access Wi-Fi or LTE macro cell |
| Vehicle stationary | Automatically turns on for near-field or local communications | On for communications to coordinating node, core network | On for devices inside vehicle only | On | On, using self-organizing network (SON) algorithm to determine power | UE attaches to in-vehicle LTE, or to macro, or to access Wi-Fi |

Tracking Area Management

In some embodiments, UE location management and tracking area management may be enhanced based on knowledge of the current location of the mobile base station. For example, a mobile base station may have a number of mobile devices attached to it, and the mobile base station may be configured at the core network to provide access to at least one the tracking area. The tracking area may be identified at a mobility management entity (MME) in an operator core network or at a cloud coordination server, which may be in the signaling path between the eNodeB and the MME. In this configuration, the location of the attached mobile devices may be determined using the GPS location of the mobile base station, in addition to the location linked to the tracking area.

In some embodiments, a mobile base station may be configured based on its location. For example, a mobile base station may report its location to a core network or a cloud coordination server. The core network and/or cloud coordination server may additionally report the location of the mobile base station to an administrative user at an administrative console. Based on administrative user action or based on a prior configuration, and based on the location of the location of a UE attached to the mobile base station. While a tracking area may be associated with a fixed geographic area and the base stations located within that area, by virtue of it being mobile, the mobile base station may move between multiple tracking areas. This results in inefficiencies, such as excessive TAUs, if the mobile base station updates itself and all its attached UEs every time it moves between tracking areas.

The mobile base station may configure itself based on the receipt of this information from the core network or cloud coordination server. The configuration information may include an appropriate power level, an appropriate directionality of broadcast power, a list of neighbors, a list of tracking areas, and/or other information. The administrative user may be enabled to see the location of one or more mobile base stations on a map.

In some embodiments, all mobile base stations may be assigned to a special macro zone. Using the special macro zone, the location of any UEs attached to the mobile base stations may be determined precisely using the periodically-updated location information of the mobile base stations. This may allow emergency services, e.g., police, ambulance or fire, to send the personnel with greatest proximity to the scene, reducing time from an initial emergency services call to the delivery of emergency services.

The cloud coordination server may coordinate handovers and mobility management between multiple tracking areas, or a mobility management entity (MME) in the core network may coordinate the handovers with brokering by the cloud coordination server.

Mobile Base Station Configuration

In some embodiments, the mobile base station may turn on, and connect to a cloud coordination server. The cloud coordination server may provide information to the mobile base station that may include configuration parameters, such as neighboring Wi-Fi mesh nodes, tracking areas, tracking area locations in GPS coordinates, appropriate transmit power for mobile and non-mobile situations, appropriate thresholds for detecting mobility, auto neighbor relations, physical cell IDs, neighbor tables, black/whitelists of mesh nodes or UEs that may or may not attach, and other configuration parameters.

In some embodiments, a mobile base station may be mounted in a trunk of a vehicle, or in another location that is not physically accessible to passengers of the vehicle. The mobile base station may provide a wireless configuration network. The wireless configuration network may be provided using existing radio interfaces, or dedicated radio interfaces. For example, either a re-used or a dedicated Wi-Fi network interface may be used. A configuration device, such as a tablet computer or smartphone compatible with a type of Wi-Fi or another localized access wireless networking protocol may be enabled to connect to the wireless configuration network. Once connected, the configuration device may be used to perform configuration tasks, adjust configurable parameters, monitor status of the mobile base station or the mobile RAN, monitor information about the core network, monitor information about other mobile devices and mobile base stations, and/or change information or initiate tasks and processes for configuration, in some embodiments. The tablet computer or smartphone may provide a convenient way to enable an operator to provide configurability while allowing the mobile base station to be secured and protected elsewhere in the vehicle. A configuration device may be enabled to use a web-based interface, or a command-line interface such as a shell or limited shell, in some embodiments.

Figure 1:
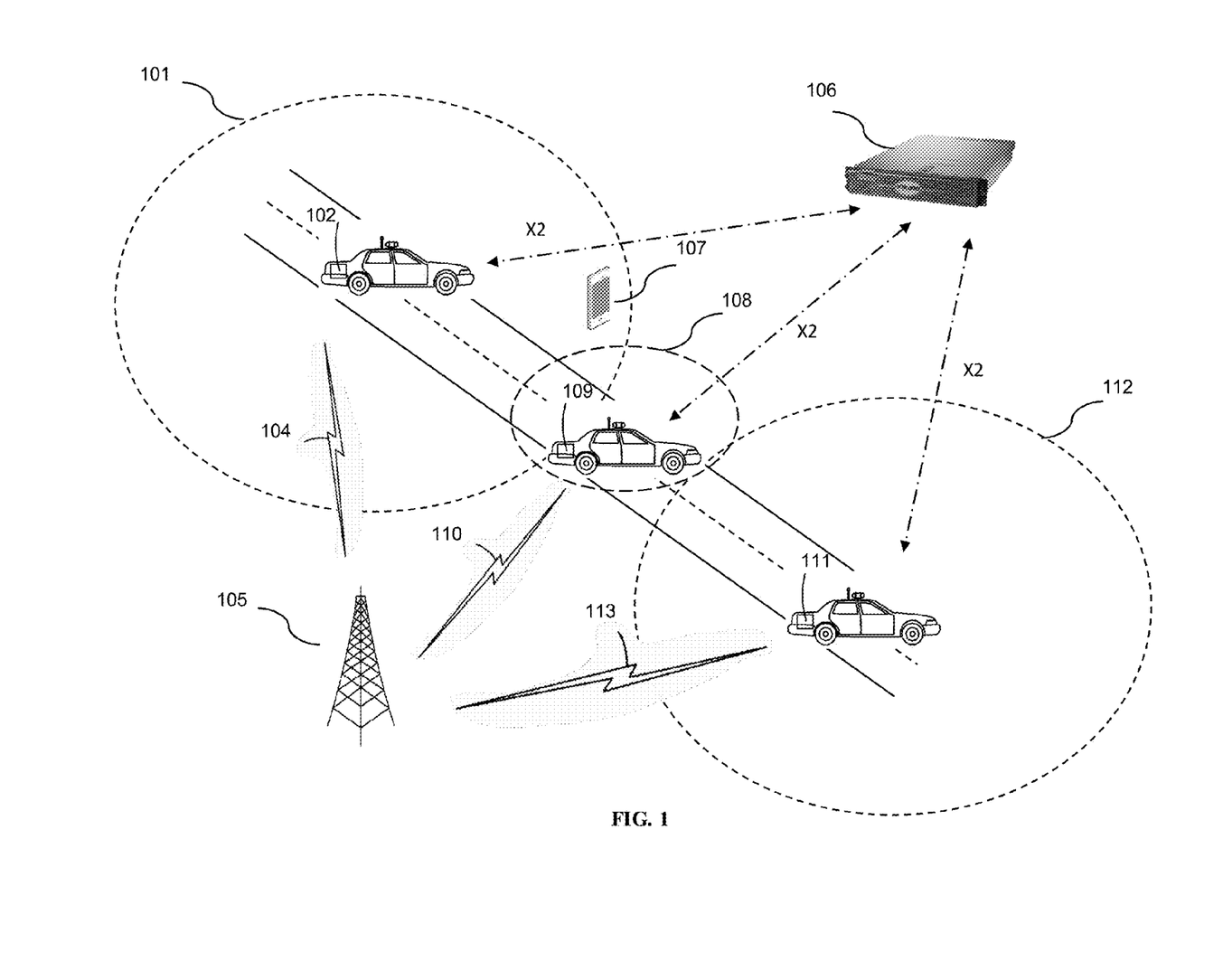
FIG. 1 is a schematic diagram of an in-vehicle base station in operation, in accordance with some embodiments.

FIG. 1 is a schematic diagram of an in-vehicle base station in operation, in accordance with some embodiments. In-vehicle base station 102 is broadcasting a RAN with coverage area 101, and UE 107 is attached to it. Backhaul for in-vehicle base station is provided via connection 104 to macro cell 105. In-vehicle base station is also communicating with coordinating server 106. In-vehicle base station 102 is stationary.

In-vehicle base station 109 has begun moving, and has contracted its coverage area to coverage area 108, in order to prevent unnecessary attaches, for example, to prevent UE 107 from attaching to it and then having to immediately detach from it. In-vehicle base station 109 is backhauled to the same macro cell 105, via connection 110, and is also in communication with coordinating node 106. In-vehicle base station 111 has stopped moving and has again expanded its coverage area to coverage area 112. In-vehicle base station 111 is backhauled to the same macro cell 105, via connection 113, and is also in communication with coordinating node 106.

Figure 2:
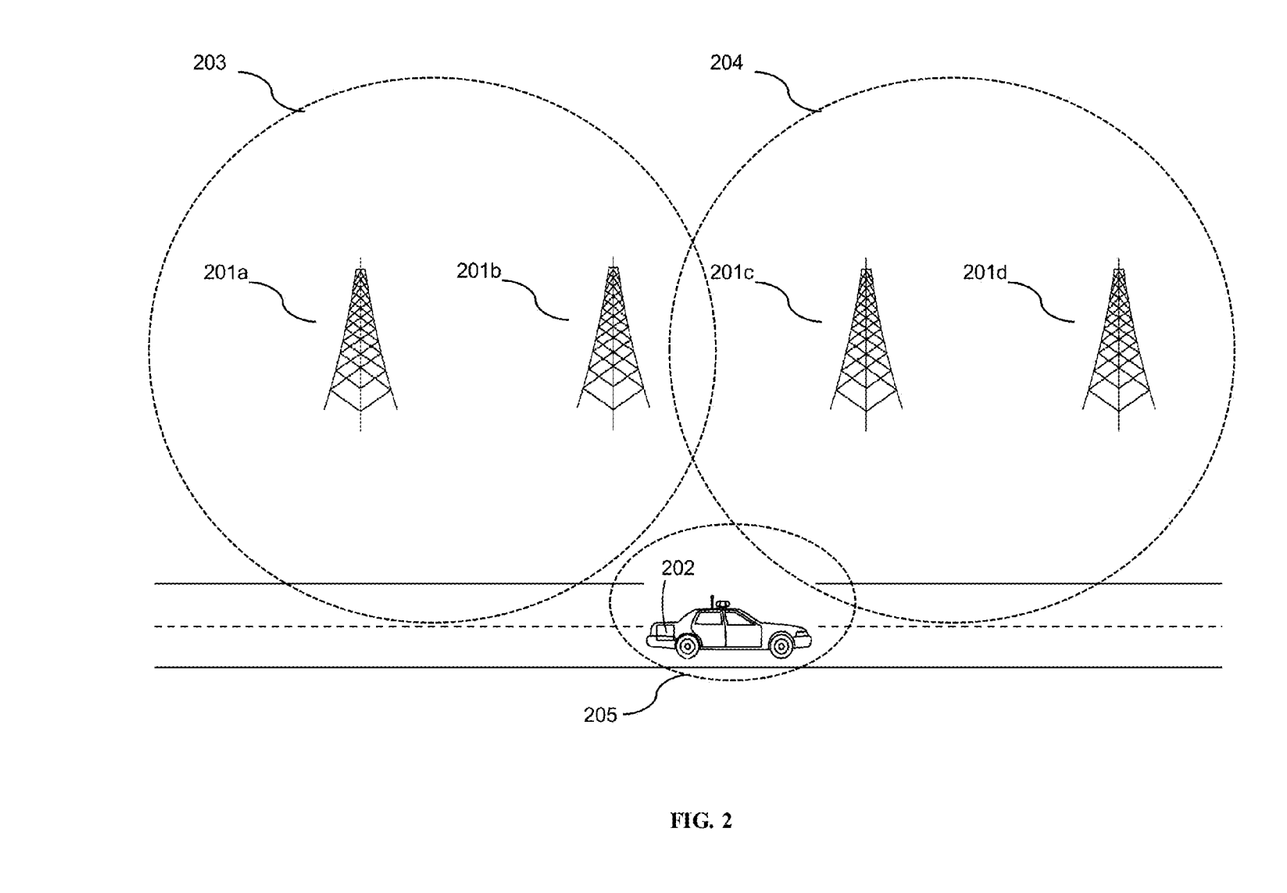
FIG. 2 is a schematic diagram of a tracking area configuration, in accordance with some embodiments.

FIG. 2 is a schematic diagram of a tracking area configuration, in accordance with some embodiments. A vehicle has an in-vehicle base station 202 broadcasting a small RAN with coverage area 205, with one or more UEs attached to it. The one or more UEs each have an associated tracking area, for use when the UEs go into IDLE mode. While in motion along a highway, in-vehicle base station 202 connects to macro cell 201a, then to macro cell 201b, then to macro cell 201c, then to macro cell 201d. Macro cells 201a and 20ab share a single tracking area code, indicated by tracking area boundary 203. Macro cells 201c and 201d also share a second tracking area code, indicated by tracking area boundary 204.

When in-vehicle base station 202 moves from the coverage area of macro cell 201b to that of cell 201c, in some embodiments, the in-vehicle base station itself, which may operate like a UE or using an LTE relay specification, may take on the tracking area of the new cell, and may need to perform a tracking area update. However, it is undesirable for all devices connected to the in-vehicle base station to also perform a tracking area update. This is because each tracking area update (TAU) is a relatively heavyweight operation and causes unnecessary signaling load on the network, involving sending a variety of radio resource control parameters to the eNodeB, and a context transfer from a first mobility management entity (MME) to a second MME, etc. If a TAU is required to be performed for every device attached to the in-vehicle base station at the same time, the combination of all the required TAUs can negatively impact the network, especially if a large vehicle, like a bus, includes a large number of UEs requesting a TAU. Also, this type of TAU merely results in another TAU as soon as the moving vehicle exits the area.

Using a single tracking area associated with in-vehicle eNodeB 202, unnecessary TAUs of UEs attached to in-vehicle eNodeB 202 can thereby be avoided.

In some embodiments, the in-vehicle base station itself does not need to use the tracking area of a nearby cell, and uses its own special tracking area at all times, making a tracking area update unnecessary when it moves between backhaul coverage cells.

Figure 3:
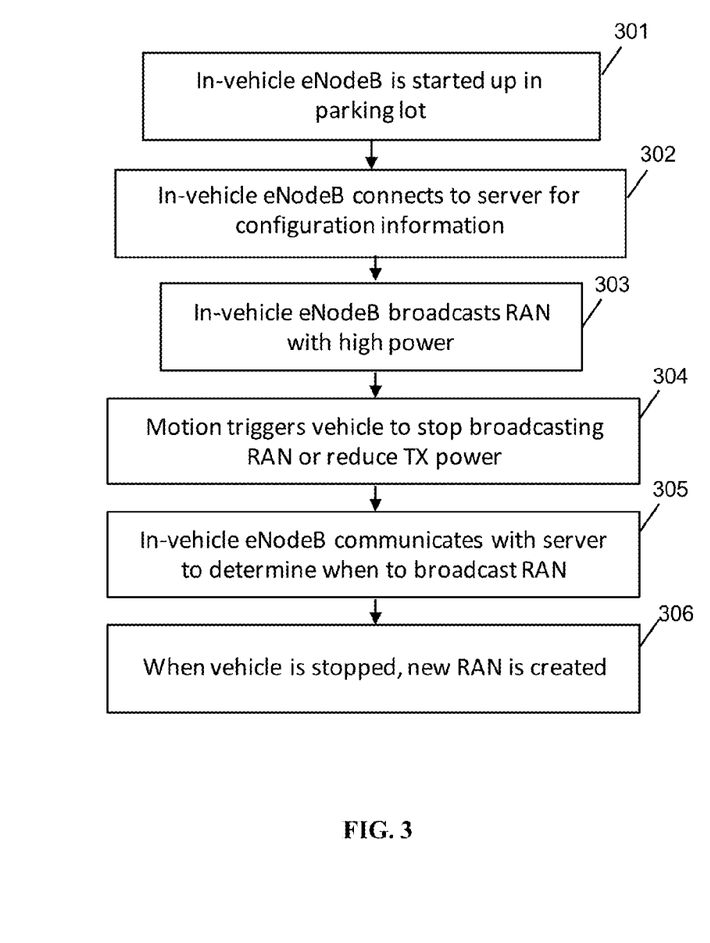
FIG. 3 is a flowchart depicting an operational method of an in-vehicle base station, in accordance with some embodiments.

FIG. 3 is a flowchart depicting an operational method of an in-vehicle base station, in accordance with some embodiments. At step 301, a vehicle is started up in a parking lot, which causes the in-vehicle eNodeB to be started up as well. At step 302, the in-vehicle eNodeB attempts to connect to a cloud server for configuration information, including information about what type of RAN to start up, in some embodiments. At step 303, the in-vehicle eNodeB may be in a stationary state and may broadcast a RAN at a normal power or high power, meaning sufficient power to cover an area around the vehicle, including potentially penetrating into nearby buildings, or providing an access connection to a nearby mesh network.

At step 304, when the vehicle begins to move and exceeds a certain threshold of motion, either based on position, velocity, acceleration, dead reckoning, GPS, or another measure, the base station may identify that it should enter into another mode of operation. In some embodiments, a vehicle controller area network (CAN) bus may be monitored to determine when the vehicle is in motion. The in-vehicle base station may, in some embodiments, automatically stop broadcasting at all, or may reduce its coverage area to only an area sufficient to provide access to users inside the vehicle, or may reduce transmission on one or another of its access radios but not the other, in some embodiments. It may be useful, for example, to provide a Wi-Fi-only wireless access network with coverage area sufficient to cover the inside of a vehicle during vehicle travel, enabling a user to use a Wi-Fi-enabled smartphone or tablet, and it may be helpful to enable one or more passengers to connect to a configuration network or debug network to configure the in-vehicle base station, such as described in U.S. application Ser. No. 14/946,129, hereby incorporated by reference in its entirety for all purposes, even when backhaul is not available.

At step 305, the in-vehicle eNodeB may communicate with the coordination server to determine what to do at this stage, as well. Either at the time the in-vehicle eNodeB begins to move, or stops moving, or while in motion, the in-vehicle eNodeB may coordinate the RAN with the coordination server. This may help if there are, for example, other nodes in the area that the eNodeB should avoid interfering with, or if there are other nodes in the area (e.g., a fleet of cars) that need coverage or backhaul, or if there is an area ahead where no backhaul will be available anyway. In some embodiments, coverage and/or transmission power may be dynamically changed while the vehicle is in motion to, for example, avoid interfering with signals along the vehicle's route.

At step 306, when the vehicle is stopped, a new RAN may be created. In some embodiments, this may be under the direction of the coordinating node. In some embodiments, a new tracking area may be entered into. For example, an in-vehicle base station may use one tracking area code when in motion and another tracking area code (such as the tracking area code of the nearest cell or of a backhaul cell) when not in motion.

Figure 4:
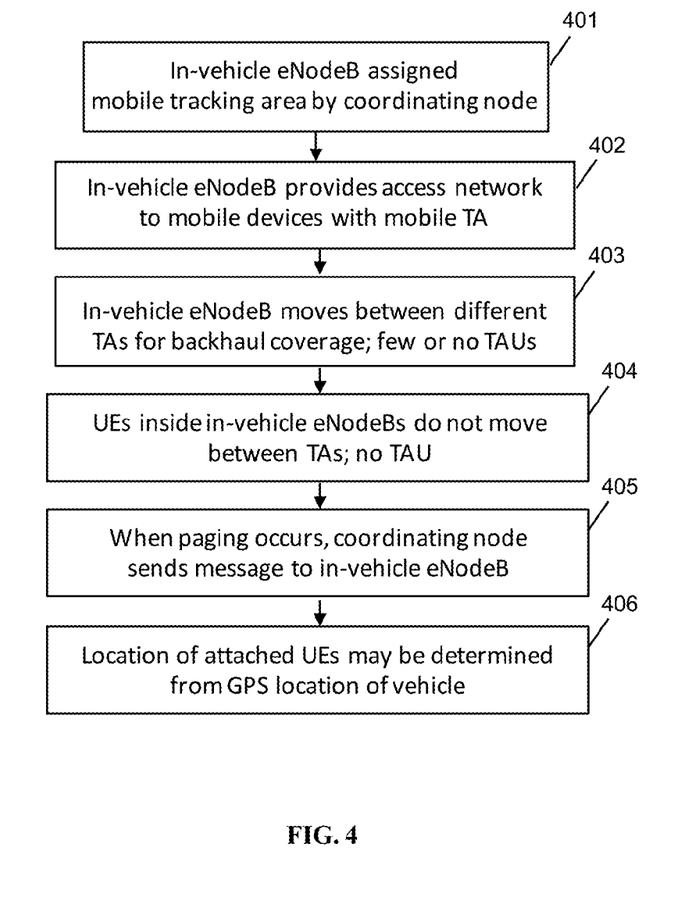
FIG. 4 is a flowchart depicting a tracking area sequence of operation, in accordance with some embodiments.

FIG. 4 is a flowchart depicting a tracking area sequence of operation, in accordance with some embodiments. At step 401, an in-vehicle eNodeB is assigned a special mobile tracking area by a coordinating node. The coordinating node may, in some embodiments, assign all in-vehicle base stations the same mobile tracking area, or different mobile tracking areas. The mobile tracking area may be handled differently for purposes of paging UEs within that tracking area. For example, UEs within the mobile tracking area may be assumed to be located within close proximity to a GPS location of the in-vehicle base station itself.

At step 402, the in-vehicle eNodeB provides an access network to certain user devices and provides the mobile tracking area to those devices. The user devices may be UEs, or may be Wi-Fi devices, or may be mobile devices connected via a trusted Wi-Fi gateway (e.g., a TWAG or ePDG) to a core network via a Wi-Fi access network, in some embodiments. Each of these devices is associated in the core network with the mobile tracking area.

At step 403, the in-vehicle eNodeB may move between different tracking areas for backhaul coverage. As the in-vehicle eNodeB travels, it attaches to different macro cells, for example, for backhaul coverage. These macro cells may be in different operator tracking areas. When the in-vehicle eNodeB moves to a different tracking area, the in-vehicle eNodeB itself may associate with the new tracking area via a tracking area update (TAU) message sent to the core network; however, UEs attached to the in-vehicle eNodeB need not send a TAU and remain on the special mobile tracking area, as shown at step 404.

At step 405, when paging of a UE attached to the in-vehicle eNodeB occurs, the core network seeks to page the UE by sending a paging message to the tracking area. However, the tracking area includes only the in-vehicle eNodeB, which sends a wakeup message to the UE. At step 406, if the location of the UE is desired, for example for directing emergency services personnel, the coordinating node may act as a proxy and may query the in-vehicle base station to determine its location, which may then be used as the location of the UE. In some embodiments, all calls from a given tracking area may be known to the coordinating node as coming from a mobile base station, and location requests may be directed from the core network to the coordinating node for locating the mobile base station.

Figure 5:
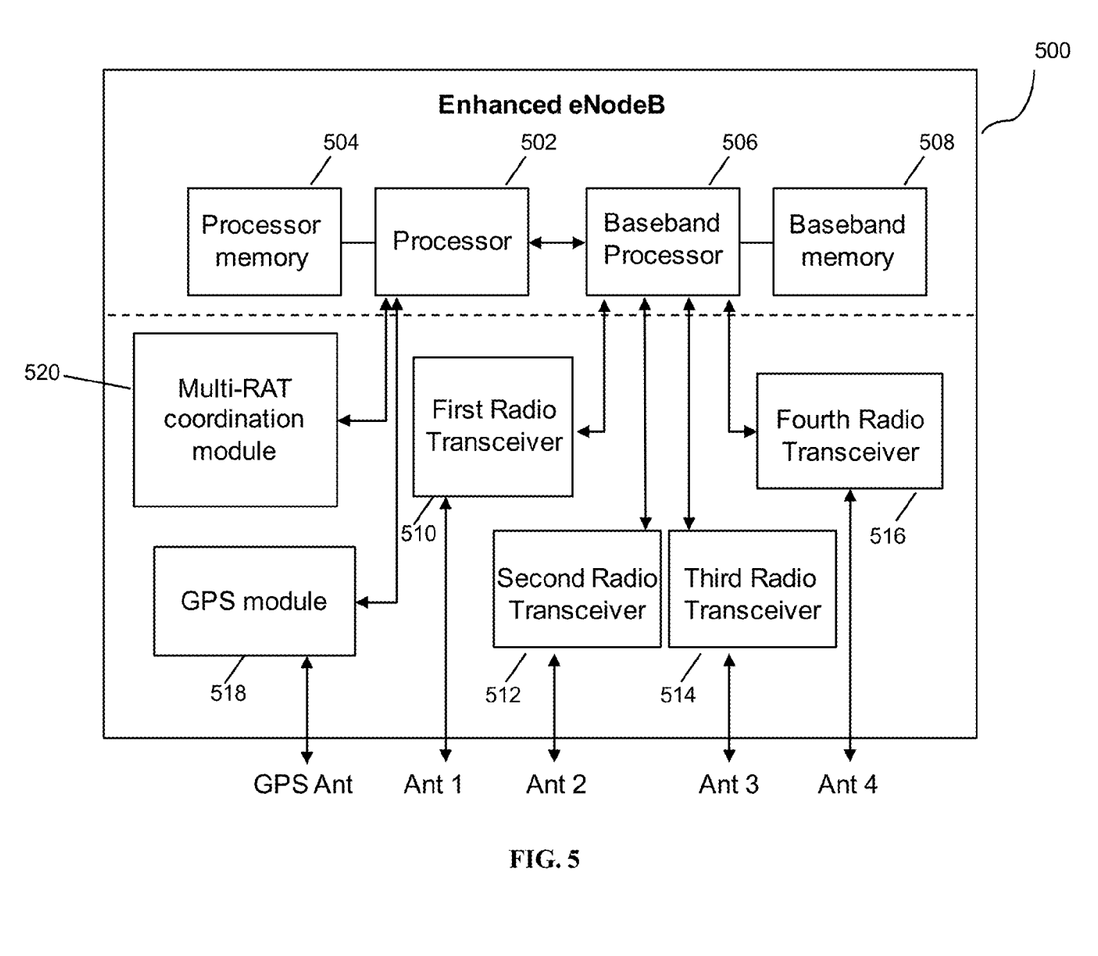
FIG. 5 is a schematic diagram of an enhanced eNodeB, in accordance with some embodiments.

FIG. 5 is a schematic diagram of an enhanced eNodeB, in accordance with some embodiments. Enhanced eNodeB 500 may include processor 502, processor memory 504 in communication with the processor, baseband processor 506, and baseband processor memory 508 in communication with the baseband processor. Enhanced eNodeB 500 may also include first radio transceiver 510, second radio transceiver 512, third radio transceiver 514, and fourth radio transceiver 516, in some embodiments. Enhanced eNodeB 500 may also include GPS module 518 and multi-radio access technology (multi-RAT) coordination module 520, in some embodiments, which may be in communication with a coordination server (not shown).

Processor 502 and baseband processor 506 are in communication with one another. Processor 502 may perform routing functions, and may determine if/when a switch in network configuration is needed. Baseband processor 506 may generate and receive radio signals for both radio transceivers 510 and 512, based on instructions from processor 502. In some embodiments, processors 502 and 506 may be on the same physical logic board. In other embodiments, they may be on separate logic boards.

First radio transceiver 510 may be a radio transceiver capable of providing LTE eNodeB access functionality, and may be capable of higher power and multi-channel OFDMA. The second radio transceiver 512 may be a radio transceiver capable of providing LTE UE functionality, for providing backhaul for enhanced eNodeB 500. Both transceivers 510 and 512 are capable of receiving and transmitting on one or more LTE bands. In some embodiments, either or both of transceivers 510 and 512 may be capable of providing both LTE eNodeB and LTE UE functionality. Transceiver 510 may be coupled to processor 502 via a Peripheral Component Interconnect-Express (PCI-E) bus, and/or via a daughtercard, and may be connected to a SIM card (not shown) for authenticating to the core network as a UE. In some embodiments, the mobile base station may use direct current (DC) power from the vehicle's battery.

Third radio transceiver 514 may be a radio transceiver capable of Wi-Fi access functionality, i.e., acting as a Wi-Fi access point. Fourth radio transceiver 516 may be a radio transceiver capable of providing Wi-Fi mesh capability, which may be point-to-point mesh capability. Either or both of transceivers 514 and 516 may be able to use IEEE 802.11a/b/g/n/ac/af/ah, or another protocol, and may be able to use 2.4 GHz spectrum bands, 5.x GHz spectrum bands, or another spectrum band. Either or both of transceivers 514 and 516 may provide WiGig functionality in a gigahertz spectrum band.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 510, 512, 514, 516, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 502 for reconfiguration.

Other elements and/or modules may also be included, such as a home eNodeB, a local gateway (LGW), or another module. Additional radio amplifiers, radio transceivers and/or wired network connections may also be included.

GPS module 518 may also be provided, and in order to acquire a GPS signal, it may be connected to a GPS antenna located outside of a vehicle, in some embodiments. GPS, GLONASS, AGPS, dead reckoning, or any other type of location detection apparatus may be used. In some embodiments, sensor fusion may be used to fuse one or more GPS locations identified at enhanced eNodeB 500, or to fuse a GPS location acquired by the vehicle itself or attached UEs within the vehicle, in some embodiments.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 510, 512, 514, 516. Baseband processor 506 may use memory 508 to perform these tasks.

In some embodiments, enhanced base station 500 may be embodied in an enclosure with multiple radio frequency (RF) function-containing daughtercards, the daughtercards located near the periphery of an enclosure, each in individual trays for RF isolation. The trays may be formed all in a single piece with each other, so as to reduce mounting hardware required. Mounting holes may be provided for mounting to a vehicle chassis. Standard coaxial cable connection ports may be provided for connecting to RF antennas exterior to the unit.

In some embodiments, a tablet or other mobile device for configuring and operating the enhanced base station 500 may be provided with the base station, and the wireless access network from base station 500 may be activated to permit the mobile device to configure base station 500, even when it is mounted in a vehicle trunk or in a location inaccessible to a passenger while the vehicle is in motion.

Figure 6:
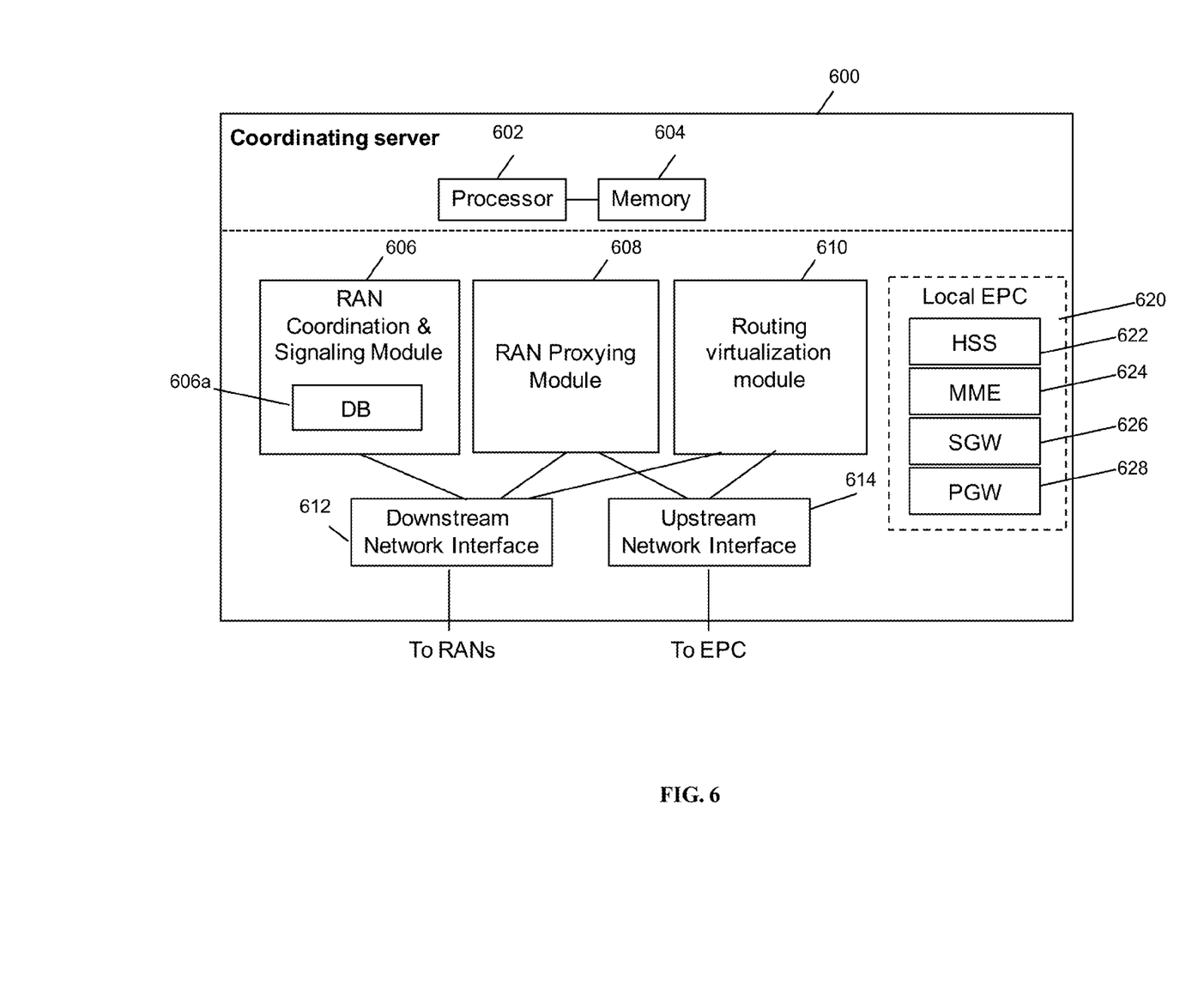
FIG. 6 is a schematic diagram of a coordinating server, in accordance with some embodiments.

FIG. 6 is a schematic diagram of a coordinating server, in accordance with some embodiments. Coordinating server 600 includes processor 602 and memory 604, which are configured to provide the functions described herein. Also present are radio access network coordination/signaling (RAN Coordination and signaling) module 606, RAN proxying module 608, and routing virtualization module 610.

RAN coordination module 606 may include database 606a, which may store associated UE signal quality parameters and location information as described herein. In some embodiments, coordinating server 600 may coordinate multiple RANs using coordination module 606. If multiple RANs are coordinated, database 606a may include information from UEs on each of the multiple RANs.

In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). Paging functions may be performed in module 606.

Coordinating server 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

Figure 7:
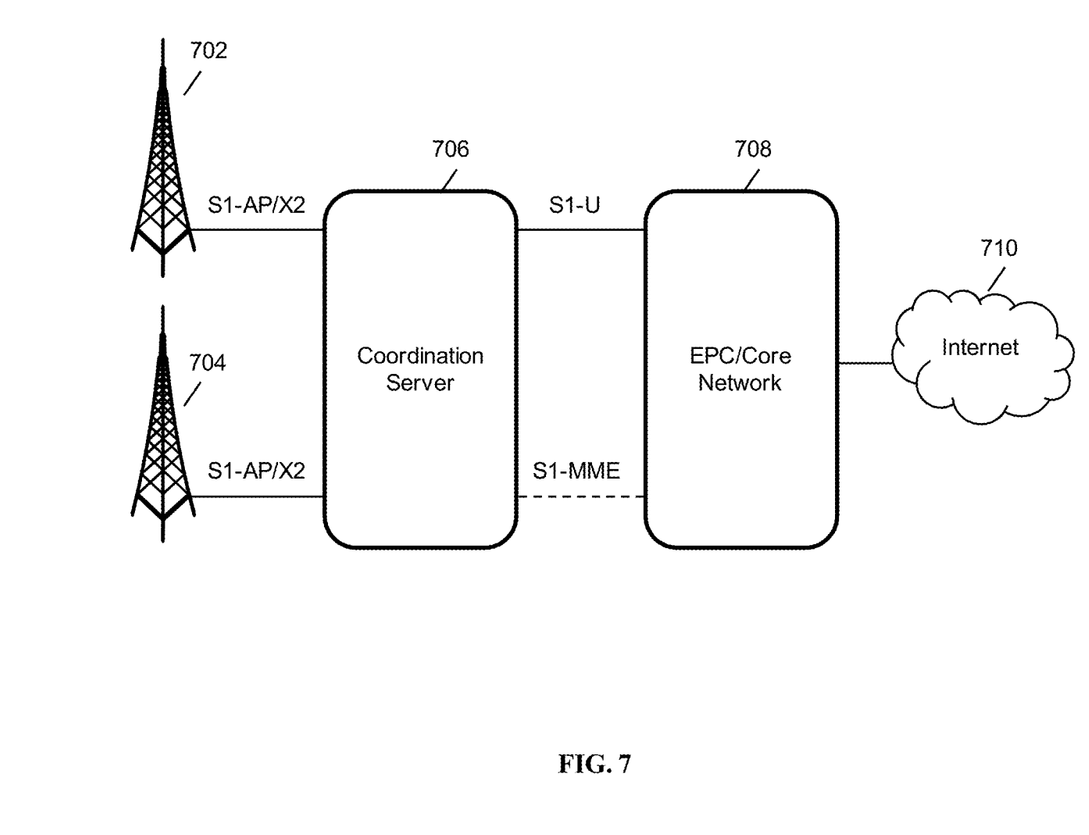
FIG. 7 is a system architecture diagram of an exemplary network configuration, in accordance with some embodiments.

FIG. 7 is a system architecture diagram of an exemplary network configuration, in accordance with some embodiments. Base stations 702 and 704 are connected via an S1-AP and an X2 interface to coordination server 706. Base stations 702 and 704 are eNodeBs, in some embodiments. Coordination server 706 is connected to the evolved packet core (EPC)/Core Network 708 via an S1 protocol connection and an S1-MME protocol connection. Coordination of base stations 702 and 704 may be performed at the coordination server. In some embodiments, the coordination server may be located within the EPC/Core Network 708. EPC/Core Network 708 provides various LTE core network functions, such as authentication, data routing, charging, and other functions. In some embodiments, mobility management is performed both by coordination server 706 and within the EPC/Core Network 708. EPC/Core Network 708 provides, typically through a PGW functionality, a connection to the public Internet 710.

In some embodiments, coordination server 706 may act as an S1 proxy, X2 proxy, back-to-back proxy, or other proxy for some or all eNodeBs connected to it relative to EPC/core network 708. By leveraging its position in the network, coordination server 706 may appear to be a single eNodeB to the network, while managing multiple eNodeBs connected to it. In some embodiments, coordination server may route X2 messages, handover tunnel data, and other data among its connected base stations, and may perform handovers and other signaling-related procedures among its connected base stations without the involvement of EPC/core network 708.

In some embodiments, the radio transceivers described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In the present disclosure, the words location and position may be used in various instances to have the same meaning, as is common in the relevant art.

Although the scenarios for interference mitigation are described in relation to macro cells and micro cells, or for a pair of small cells or pair of macro cells, the same techniques could be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, an in-vehicle base station may be configured to coordinate its tracking area in conjunction with other in-vehicle base stations.

The invention claimed is:

1. A mobile base station, comprising:
 a processor configured to provide a cellular base station functionality;
 a first access radio electrically coupled to the processor for providing a cellular access network inside and outside a vehicle;
 a first cellular backhaul radio electrically coupled to the processor for providing a backhaul connection to a cellular network via a cell; and
 a global positioning system (GPS) module electrically coupled to the processor for determining a location of the mobile base station,
 wherein the processor is configured to transmit the location of the mobile base station to the cellular network, disable the first access radio for providing the cellular access network outside the vehicle when the vehicle is in motion, and enable the first access radio when the vehicle is stationary with a power level determined using a self-organizing network (SON) algorithm.

2. The mobile base station of claim 1, wherein the mobile base station is an eNodeB, wherein the first cellular backhaul radio is a Long Term Evolution (LTE) radio, and wherein the cellular access network is an LTE cellular access network.

3. The mobile base station of claim 1, wherein the mobile base station is affixed to one of a car, a truck, a van, a trailer, a plane, a boat, a drone, or a balloon.

4. The mobile base station of claim 1, further comprising a second access radio for providing a second access network, the first and second access radios being configured to provide access network using a Long Term Evolution (LTE) air interface and a Wi-Fi air interface, respectively.

5. The mobile base station of claim 1, wherein the speed of the vehicle is determined based on either the GPS module or a vehicle controller access network (CAN) bus.

6. The mobile base station of claim 1, wherein the mobile base station is configured to use the first backhaul radio to communicate with a coordinating node for determining a transmit power of the first access radio.

7. The mobile base station of claim 1, wherein the mobile base station is configured to use the first backhaul radio to receive an appropriate power level, a directionality of broadcast power, a neighbor list, or a tracking area list from a coordinating node.

8. The mobile base station of claim 1, further comprising a tablet connected to the first access radio, the mobile base station being configured to permit the tablet to access and reconfigure the mobile base station.

9. The mobile base station of claim 1, wherein the processor is further configured to enable a Wi-Fi mesh radio when the vehicle is stationary for near-field or local communications.

* * * * *